United States Patent

Boddy et al.

[11] Patent Number: 5,703,731
[45] Date of Patent: Dec. 30, 1997

[54] EXTERIOR MIRROR WITH INDEXING AND CONTROL PIVOTING

[75] Inventors: Ian Boddy, Ada; Matthew D. Potts, Kentwood; Keith D. Foote, Wayland, all of Mich.

[73] Assignee: Lowell Engineering Corporation, Alto, Mich.

[21] Appl. No.: 612,068

[22] Filed: Mar. 7, 1996

Related U.S. Application Data

[63] Continuation-in-part of Ser. No. 373,742, Jan. 17, 1995.

[51] Int. Cl.$^6$ .............................. G02B 5/08; G02B 7/182; B60R 1/06
[52] U.S. Cl. .................. 359/841; 359/872; 359/877; 248/479; 248/483; 248/549; 248/900
[58] Field of Search ........................ 359/841, 872, 359/877; 248/549, 479, 483, 900; 318/445, 446, 468, 469, 484

[56] References Cited

U.S. PATENT DOCUMENTS

| | | | |
|---|---|---|---|
| 4,626,083 | 12/1986 | Nakayama et al. | 359/877 |
| 4,626,084 | 12/1986 | Kumai | 359/841 |
| 4,832,477 | 5/1989 | Torii et al. | 359/877 |
| 4,893,916 | 1/1990 | Sakuma et al. | 359/877 |
| 4,915,493 | 4/1990 | Fisher et al. | |
| 4,981,349 | 1/1991 | Tamiya et al. | |
| 5,432,641 | 7/1995 | Mochizuki | 359/841 |
| 5,467,230 | 11/1995 | Boddy et al. | |
| 5,477,390 | 12/1995 | Boddy et al. | 359/877 |
| 5,477,391 | 12/1995 | Boddy | |

*Primary Examiner*—Ricky D. Shafer
*Attorney, Agent, or Firm*—Cushman Darby & Cushman Intellectual Property Group of Pillsbury Madison & Sutro LLP

[57] ABSTRACT

A vehicle mirror assembly comprising a housing assembly, a mirror unit, a support assembly to support the housing assembly thereon, a power operated pivot assembly between the support assembly and the housing assembly to enable the housing assembly to be pivoted with respect to the support assembly about a generally upright axis (1) between an operative position and a folded position in response to the power operation of the pivot assembly and (2) from the operative position thereof in either direction in response to an unwanted impact blow applied in either direction thereto. A spring biased pivotal control system is disposed between a movable tubular member of the pivot assembly and the support assembly to provide a control resistance to pivotal movement of the movable tubular member and hence the housing assembly connected thereto. A spring biased indexing system is disposed between a motion transmitting member and the movable tubular member to (1) transmit the movement of the motion transmitting member under power to the movable tubular member to thereby move the housing assembly between the operative and folded positions with the control system providing a control resistance and (2) allow the movable tubular member to be moved from the operative position relative to the motion transmitting member in response to an unwanted impact blow applied to the housing assembly in either direction to move the housing assembly from the operative position with the indexing system providing an indexing resistance to such movement which is independent of the control resistance.

16 Claims, 2 Drawing Sheets

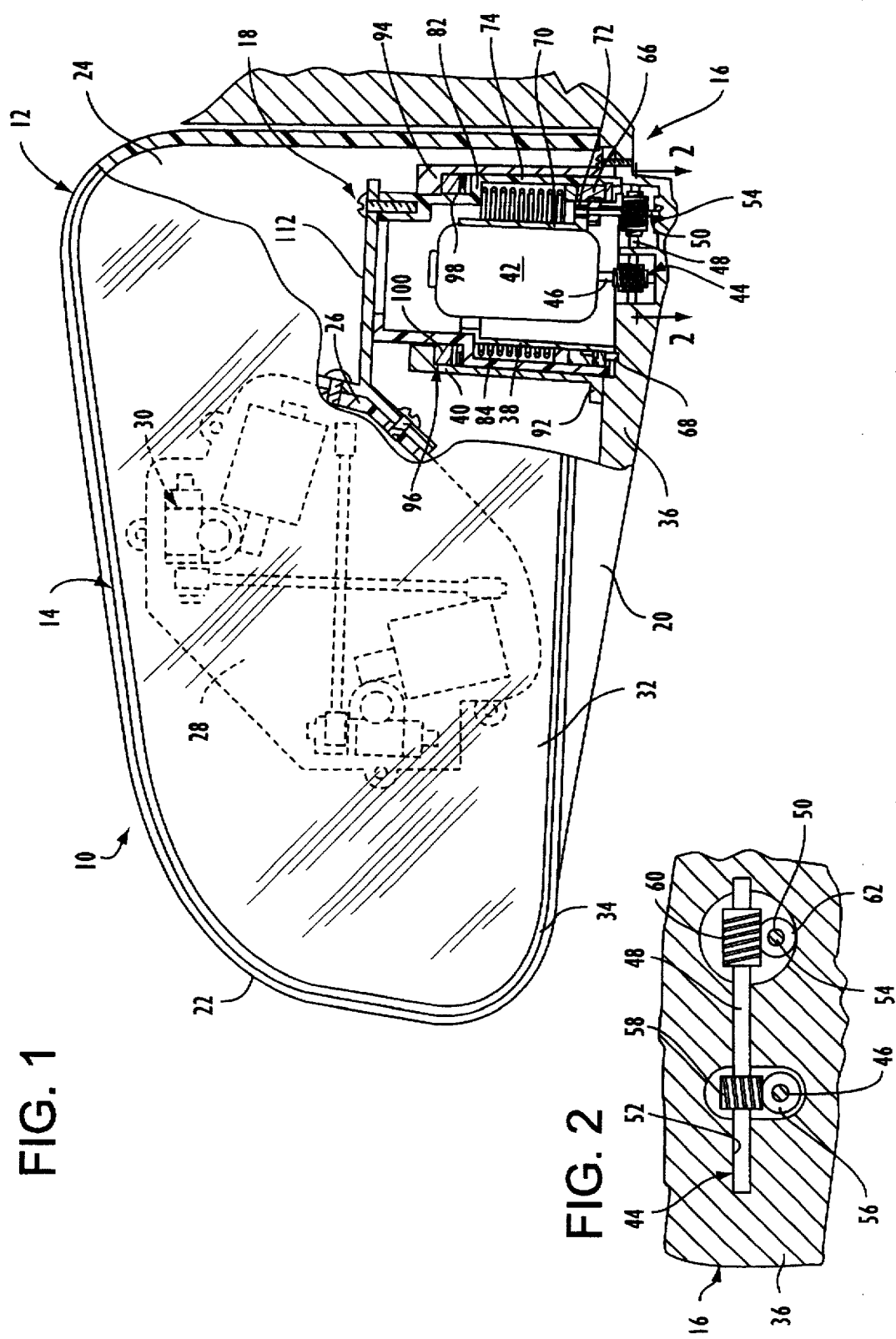

EXTERIOR MIRROR WITH INDEXING AND CONTROL PIVOTING

BACKGROUND OF THE INVENTION

This application constitutes a continuation-in-part of U.S. patent application Ser. No. 08/373,742, filed Jan. 17, 1995, for an exterior mirror with single pivot power fold.

FIELD OF THE INVENTION

Brief Description of the Art

The vehicle mirror assembly disclosed in the aforesaid application is an exterior door mounted vehicle mirror assembly of the single pivot type capable of power movement in a rearward direction into a folded position and of impact force movement either into the rearward folded position or away from its operative position in a forward direction.

An important aspect of any such mirror assembly is the manner in which the housing assembly is mounted on the support assembly for pivotal movement and the manner in which the pivotal movement is controlled. It is known to provide a pivotal control system between the housing assembly and support assembly which is operable during any type of pivotal movement and to integrate this control system with the indexing system provided to accommodate the impact force pivoting when power pivoting is not being used. An example of such an integrated dual control and indexing system is disclosed in U.S. Pat. No. 4,981,349. All of the integrated dual control and indexing systems disclosed in the '349 patent embody an indexing system which is integrated with the electric motor and the motion transmitting mechanism operated by the electric motor. The component which functions to integrate the indexing system with the motion transmitting mechanism is a spur gear to which the entire motion transmitting mechanism with its cumulative backlash is intermeshed. The indexing system is connected between the fixed support structure of the mirror assembly and the spur gear. The control system allows the mirror housing to move out of the normal viewing position thereof toward the folded position with relatively little resistance. When the mirror housing has been moved into its normal viewing position by the motor, the motion transmitting mechanism serves to bias the mirror housing into the normal viewing position where the control system provides a relatively high resistance to movement beyond the normal viewing position. This relatively high resistance to movement is sufficient to take up the cumulative backlash of the motion transmitting mechanism and provide sufficient control to maintain the mirror housing in a stable condition. However, when the mirror housing is moved into its normal viewing position other than by power, the cumulative backlash of the motion transmitting mechanism is not taken up leaving the mirror housing in a relatively unstable condition. In accordance with the teachings of the present invention, this problem of lack of full control can be overcome by indexing the integrating spur gear of the motion transmitting mechanism with the movable housing rather than the fixed support structure.

SUMMARY OF THE INVENTION

Accordingly, it is an object of the present invention to provide a mirror assembly which retains stability control under all conditions. In accordance with the principles of the present invention, this objective is achieved by providing a vehicle mirror assembly comprising a housing assembly and a mirror unit mounted on the housing assembly. A support assembly is constructed and arranged to be fixedly mounted on a vehicle and to support the housing assembly thereon in an operative position extending laterally outwardly from the vehicle so that the mirror unit serves as an exterior rear view mirror for the driver of the vehicle. A power operated pivot assembly is provided between the support assembly and the housing assembly constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes an electric motor and a speed reduction motion transmitting assembly between an output shaft of the electric motor and the housing assembly. The speed reduction motion transmitting assembly includes a motion transmitting member connected to move in response to a desired rotational movement of the output shaft and a movable tubular member positioned concentric with the axis connected to move with the housing assembly. A spring biased pivotal control system is positioned between the movable tubular member and the support assembly constructed and arranged to provide a control resistance to pivotal movement of the movable tubular member about the axis and hence the housing assembly connected thereto which control resistance (1) does not exceed a predetermined value when the housing assembly is moved in either direction between the operative and folded positions and (2) exceeds the predetermined value when the housing assembly is moved into the operative position in a direction away from the folded position and away from the operative position in response to an unwanted impact blow applied to the housing assembly in a direction away from the folded position. A spring biased indexing system is positioned between the motion transmitting member and the movable tubular member constructed and arranged to (1) transmit the movement of the motion transmitting member in response to a desired rotation of the motor shaft to the movable tubular member to thereby move the housing assembly between the operative and folded positions with the control system providing a control resistance to such movement which does not exceed the predetermined value in response to the desired rotation of the motor shaft and (2) allow the movable tubular member to be moved with the housing assembly from the operative position thereof relative to the motion transmitting member in response to an unwanted impact blow applied to the housing assembly (1) in a direction to move the housing assembly from the operative position toward the folded position with the indexing system providing an indexing resistance to such movement which is independent of the control resistance provided by the control system and (2) in a direction to move the housing assembly beyond the operative position thereof away from the folded position with the indexing system providing an indexing resistance which is independent of the control resistance provided by the control system.

Another object of the present invention is the provision of a mirror assembly of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is an elevational view of a vehicle mirror assembly embodying the principles of the present invention as viewed by looking forwardly at the lefthand side of the vehicle with the mirror assembly in its operative position, the mirror assembly being shown partly in section for purposes of clearer illustration;

FIG. 2 is an enlarged fragmentary sectional view taken along the line 2—2 of FIG. 1;

DETAILED DESCRIPTION OF THE PREFERRED EMBODIMENTS

Figure 3:
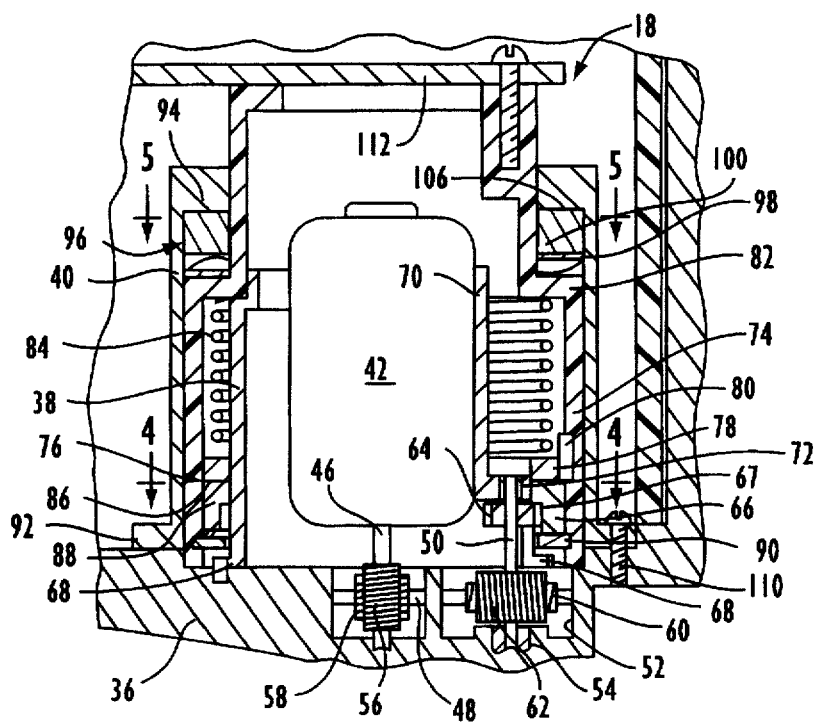
FIG. 3 is an enlarged cross-sectional view of the material shown in FIG. 1 in cross-section.

Referring now more particularly to the drawings, there is shown in FIG. 1 thereof, a vehicle mirror assembly, generally indicated at 10, which embodies the principles of the present invention. The vehicle mirror assembly 10 includes, in general, a housing assembly, generally indicated at 12, a mirror unit, generally indicated at 14, mounted on the housing assembly 12, a support assembly, generally indicated at 16, constructed and arranged to be fixedly mounted on a vehicle, and specifically a front door thereof, so that the mirror unit 14 serves as a rear view mirror for the driver of the vehicle, and a power operated pivot assembly, generally indicated at 18, between the support assembly 16 and the housing assembly 12 constructed and arranged to enable the housing assembly to be pivoted with respect to the support assembly about an upright axis (1) between the operative position thereof and a folded position with respect to the vehicle in response to the power operation of the power operated pivot assembly 18 and (2) from the operative position thereof in either direction in response to an unwanted impact below applied in either direction thereto. The power operated pivot assembly 18 also permits the housing assembly 12 to move from the operative position thereof in either direction in response to a manual or impact force applied in either direction to the housing assembly 12.

The construction of the housing assembly 12 is dependent upon whether the mirror assembly 10 is to be attached to a passenger car type automotive vehicle or other type of automotive vehicle, such as a truck or the like. In the passenger car exemplary embodiment shown, the housing assembly 12 includes a molded plastic shell structure 20 providing a rearwardly disposed periphery 22 extending in surrounding relation to the mirror unit 14 and a front wall which bulges forwardly in covering relation to the mirror unit 14.

The housing assembly 12, as shown, also includes a fixed casing member 26 which is fixed to the central portion of the front housing wall 24 or it may be molded as an integral part thereof. The fixed casing member 26 is constructed and arranged to mate with a cooperating casing member 28 which is detachably fixed thereto. Carried by and within the casing members 26 and 28 is a power operated adjusting mechanism, generally indicated at 30, which extends from the casing member 28 to the mirror unit 14. The adjusting mechanism 30 is constructed and arranged to move the mirror unit 14 in to any one of a multiplicity of adjusted positions with respect to the housing assembly 14. As shown, the adjusting mechanism 30 is constructed in accordance with the principles enunciated in commonly assigned copending U.S. Pat. No. 5,467,230, the disclosure of which is hereby incorporated by reference into the present specification. It will be understood that other known power operated mechanisms may be utilized, as, for example, the more conventional mechanism as disclosed in U.S. Pat. No. 4,915,493, the disclosure of which is hereby incorporated by reference into the present specification.

In the embodiment shown, the mirror unit 14 consists of a mirror 32 and a mirror holder 34 the forward portion of which includes mounting elements for the adjusting mechanism 30. The adjusting mechanism 30 need not be power operated but may be manually operated.

In the preferred embodiment shown, the support assembly 16 includes a rigid structure 36 which is fixed to the vehicle front door. If desired, the rigid structure 36 can be covered by a cover member (not shown) in accordance with the teachings of commonly assigned copending U.S. Pat. No. 5,477,391, the disclosure of which is hereby incorporated by reference into the present specification.

The power operated pivot assembly 18 is constructed in accordance with the principles of the present invention. The pivot assembly 18 is preferably made up of a series of components constructed and arranged to be assembled with respect to the fixed support structure 36 in a predetermined sequence of downward movements into a predetermined cooperating relation to one another. The components include an inner fixed tubular member 38 and an outer fixed tubular member 40 which are fixed to the fixed support structure 36 concentric with the upright pivotal axis provided by the pivot assembly 18, an electric motor 42 disposed within the inner tubular member 38 and a speed reducing motion transmitting assembly, generally indicated at 44, between an output shaft 46 of the electric motor 42 and the housing assembly 12.

As best shown in FIG. 2, the motion transmitting assembly 44 includes an elongated shaft 48 and a stub shaft 50 which are the first components to be assembled by downward movements into an upwardly opening bearing groove 52 and an upwardly opening bore 54 respectively formed in the fixed support structure 36. As shown, bore 54 is formed parallel with the pivotal axis to receive the lower end portion of the stub shaft 50 and the bearing groove 52 is formed in the fixed support structure 36 so that the elongated shaft 48 is journalled therein for rotation about an axis parallel to a plane passing through the axis of the stub shaft 50 and the pivotal axis provided by the pivot assembly 18.

The motion transmitting assembly 44 also includes a drive gear 56, which may be either a worm gear or a spiral gear, fixed on the motor output shaft 46 and a driven gear 58 on the elongated shaft 48 disposed in meshing relation with the drive gear 56. Fixed on the elongated shaft 48 is a secondary drive gear 60, which also may be either a worm gear or a spiral gear. A secondary driven gear 62 is fixed on the stub shaft 50 in meshing relation with the secondary drive gear 60. Fixed to the stub shaft 50 above the gear 62 is a spur gear 64 which meshes with interior periphery teeth 67 of a ring gear 66. Ring gear 66 rests on an exterior annular flange 68 formed on the lower end of the inner tubular member 38.

It will be understood that the bearing groove 52 for the elongated shaft 48 is enlarged in the area of the cooperating gears 56 and 58 and cooperating gears 60 and 62 and that the elongated shaft 48 and stub shaft 50 can be moved downwardly together during assembly or one after the other. In the preferred embodiment shown, the electric motor 42 is fixedly mounted within the inner tubular member 38 which is the next component to be assembled by moving an exterior flange 68 on the lower end thereof into engagement with the fixed support structure 36. The inner tubular member has an L-shaped wall portion 70 in one side thereof, the horizontal lug of which is apertured to receive a bearing 72 within which the upper end of the stub shaft 50 is journalled.

In order to positively prevent movement of the inner tubular member 38 about its axis which is concentric to the pivotal axis, the flange 68 may be suitably pinned to the fixed support structure 36 or otherwise prevented from turning about its axis. It will be understood that the inner tubular member 38 with the electric motor 42 fixed thereto must be assembled in such a way as to bring the drive gear 56 into meshing relation with the driven gear 58. Moreover, since the motor 42 is fixed on the fixed support structure 36, suitable grooves (not shown) can be formed in the fixed support structure 36 to accommodate the electrical control wires (not shown) for the motor 42. Motor 42 does not fill the entire space within the inner tubular member 38 permitting other wires (not shown) for operating the motors of the power operating adjusting mechanism 30 to be fed from the fixed support structure 36 through the pivot assembly 18 by passing the motor 42 within the inner tubular member 38.

The ring gear 66 forms part of a sub-assembly which is mounted within a movable tubular member 74. The sub-assembly including the movable tubular member 74 may be regarded as a component of the power operated pivot assembly 18.

Figure 4:
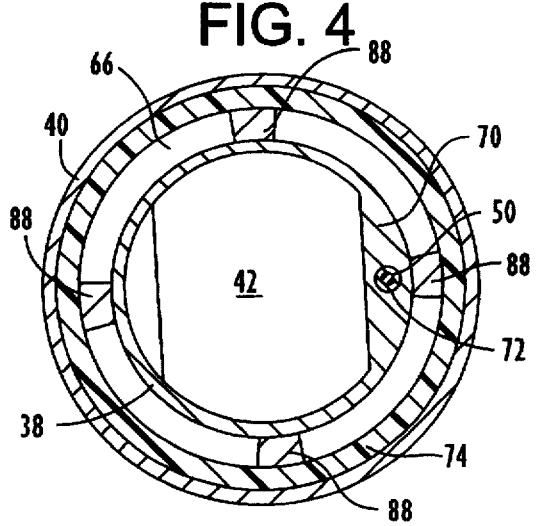
FIG. 4 is a sectional view taken along the line 4—4 of FIG. 3.

The sub-assembly includes a spring biased indexing system, generally indicated at 76, mounted between the ring gear 66 and the movable tubular member 74. As best shown in FIGS. 3 and 4, the indexing system 76 includes an indexing ring 78 which is keyed to the interior periphery of the movable tubular member 74, as by key elements 80, so that it can move axially with respect to the movable tubular member 74 but must move with the movable member 74 as it turns about its vertical axis. The movable tubular member 74 includes a radially extending portion 82 in its upper midsection which provides a downwardly facing surface on the interior periphery of the movable tubular member 74. A coil spring 84 for biasing the indexing system 76 has its upper end seated on the downwardly facing surface of the portion 82 and its lower end seated on the indexing ring 78. The indexing ring 78 has four angularly spaced downwardly opening recesses 86 formed therein, the arcuate extent of which are defined by opposite inclined surfaces. The ring gear 66 has four angularly spaced projections 88 which are shaped to be received in the recesses 86. The sub-assembly consisting of the coil spring 84, the indexing ring 78, and the ring gear 66 are moved respectively into the interior periphery of the movable tubular member 74 and retained therein with the spring in stressed condition by a conventional C-clip 90.

The movable tubular member 74 with its contained sub-assembly is assembled next by being moved downwardly over the inner tubular member 38 to mesh the ring gear 66 with spur gear 64 until the lower end of the movable tubular member 74 rests on the fixed support structure 36.

The outer tubular member 40 is the last component of the pivot assembly 18 to be assembled. It is noted that the outer tubular member 40 has an exteriorly extended flange 92 at its lower end and an interiorly directed flange 94 at its upper end. The axial extent of the outer tubular member 40 is greater than the axial extent of the movable tubular member 74 below the radial portion 82 but less than the full axial extent thereof. The relative axial sizes are such that, when the outer tubular member 40 is assembled over the movable tubular member 74 with the lower flange 92 engaging the fixed structure 36, an annular space is left between the lower surface of the upper flange 94 and the upper surface of the radial portion 82. Within this annular space, a spring biased control system, generally indicated at 96, constructed in accordance with the principles of the present invention, is mounted.

Figure 5:
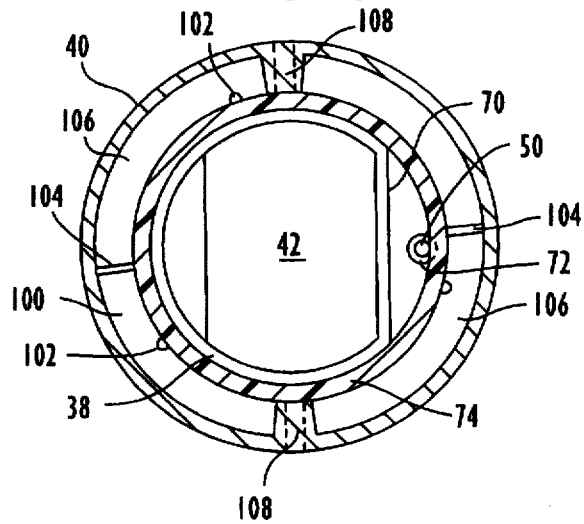
FIG. 5 is a sectional view taken along the line 5—5 of FIG. 3.

As best shown in FIGS. 3 and 5, the spring biased control system 96 includes a biasing spring 98 in the form of a wavy ring of spring steel mounted over the upper periphery of the movable tubular member 74 until it is seated on the upper surface of the radial portion 82. The control system 96 also includes a control ring 100 which is mounted over the upper periphery of the movable tubular member until it is seated on the wavy ring spring 98. Control ring 100 is keyed to the upper exterior periphery of the movable tubular member 74 by key elements 102 so that it must move with the movable tubular member 74 when it turns about its axis but may have axial movement against the spring 98 with respect to the movable tubular member 74.

The upper surface of the control ring 100 is formed with a pair of angularly spaced recesses, the arcuate extents of which are defined by inclined surfaces 104. Extending between adjacent inclined surfaces 104 of adjacent recesses are upwardly facing horizontal surfaces 106. Formed on the lower surface of the upper flange 94 of the outer tubular member 40 is a pair of angularly spaced projections 108. Each projection 108 has an arcuate extent defined by opposite inclined surfaces which is considerably less than the arcuate extent of a corresponding recess. Extending between adjacent inclined surfaces of adjacent projections, the upper flange 94 provides downwardly facing horizontal surfaces which are adapted to engage the upwardly facing surfaces 106 of the control ring 100 when the outer tubular member 40 is assembled. After the spring 98 and control ring 100 have been mounted on the movable tubular member 74, final assembly of the pivot assembly 18 is completed by extending fasteners 110 through the lower flange 92 of the outer tubular member 40 and into the fixed structure 36. A bracket 112 serves to connect the upper end of the movable tubular member 74 with the casing portion 26 to complete the entire mirror assembly 100.

When the mirror assembly 10 is assembled on a vehicle with the housing assembly disposed in its operative or mirror viewing position, the spring biased control system 96 will be in the position shown in FIGS. 3 and 5 wherein the inclined surfaces 104 on the counterclockwise sides of the surfaces 106 are engaged by inclined surfaces of the projections. In addition, the projections 88 of the indexing system 76 are disposed in the recesses 86. Wavy ring spring washer 98 applies a spring pressure which engages the downwardly facing surfaces of the upper flange 94 with the upwardly facing surfaces 106 of the control ring 100. The sliding frictional resistance provided by the spring 98 is considerably less than the resistance provided by spring 84 preventing the projections 88 of the indexing system 76 from moving out of recesses 86.

With the mirror assembly 10 in the condition indicated above, a control extended to the driver's compartment in the vehicle can be actuated to energize the electric motor 42. Preferably, the motor 42 is a reversible motor and the controls include switches or buttons for operating the electric motor 42 in either direction. In one direction of rotation of the motor 42, the drive gear 56 will impart a rotational movement to the elongated shaft 48 through meshing gear 58 and the secondary drive gear 60 on the elongated shaft 48 will, in turn, drive the driven secondary gear 62 which has the effect of turning stub shaft 50. Spur gear 64 turns with the stub shaft 50 and, by virtue of its meshing relation with the ring gear 66, the latter is rotated. Since a lesser turning resistance is provided by the control system 96 than the indexing system 76, the turning movement of the ring gear 66 will be transmitted by the indexing system 76 to the tubular member 74. Since the tubular member 74 is connected at its upper end with the housing assembly 12, the housing assembly 12 will be rotated from its operative position into its folded position. During this movement, the control resistance provided does not exceed a predetermined value. In its broadest aspects, the invention contemplates variations in the resistance below the predetermined value. Preferably, the sliding surfaces are smooth, as indicated above, and hence the resistance is constant at the predetermined value.

When the housing assembly 12 reaches the folded position, the clockwise inclined surfaces 104 will engage projections 108 creating a high resistance to further turning movement by virtue of the high spring rate provided by spring 98. This resistance causes the motor 42 to stall which, in turn, causes a current spike. A current limiter may be used to stall protect the motor. Instead of using the current limiter, it is contemplated to use a mechanical clutch to take up the left over time at the end of travel. This clutch would be placed on the intermediate shaft 48. As the last worm set is further down the gear train, it would not effect manual movements. This clutch would only slip when the mirror assembly 10 is electrically operated, and then only for long enough to take up the extra time given to meet travel requirements. When the electric motor is energized to rotate in the opposite direction, the housing assembly 12 will be rotated back into its operative position.

When the mirror housing 12 is in its operative position and a force is applied to the mirror housing in the rearward direction, the tendency for the housing assembly 12 to turn or rotate about its axis into its folded position is transmitted to the tubular member 74 by virtue of its fixed connection with the housing assembly 12. Since the electric motor 42 is inoperable and the motion transmitting mechanism 44 up to and including the ring gear 66 is held stationary, the tendency for the housing assembly 12 to pivot about its axis will be resisted by the control system and the indexing system, both of which must move in order to permit movement of the movable tubular member 74. If the force applied to the housing assembly 12 is sufficient to overcome the resistance of both, the housing assembly 12 will move from its operative position to its folded position. During this movement, the control system provides a constant resistance as before and the indexing system provides a resistance which initially increases and then becomes constant.

If a force is applied in the forward direction on the housing assembly 12 when in its operative position, a similar pivotal movement about the upright axis provided by the pivot assembly 18 will take place, enabling the housing assembly 12 to fold forwardly about its axis. During this movement, the indexing system resistance is similar to that provided during rearward movement. However, the control system resistance differs in that it initially increases and then becomes constant at the higher value. After an impact movement has taken place, the mirror housing 12 can be returned to its operative position either by power or manually.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle mirror assembly comprising a housing assembly, a mirror unit mounted on said housing assembly, a support assembly constructed and arranged to be fixedly mounted on a vehicle and to support said housing assembly thereon in an operative position extending laterally outwardly from the vehicle so that said mirror unit serves as an exterior rear view mirror for the driver of the vehicle, a power operated pivot assembly within said housing assembly constructed and arranged to enable said housing assembly to be pivoted with respect to said support assembly about a generally upright axis (1) between the operative position thereof and a folded position with respect to the vehicle in response to the power operation of said pivot assembly and (2) from the operative position thereof in either direction in response to an unwanted impact blow applied in either direction thereto, said power operated pivot assembly including an electric motor and a speed reduction motion transmitting assembly between an output shaft of said electric motor and said housing assembly and an outer fixed tubular member fixed to said support assembly, said speed reduction motion transmitting assembly including a motion transmitting member connected to move in response to a desired rotational movement of said output shaft and a movable tubular member positioned concentric with said axis connected to move with said housing assembly, a spring biased pivotal control system mounted within said outer fixed tubular member between said movable tubular member and said outer fixed tubular member and constructed and arranged to provide a control resistance to pivotal movement of said movable tubular member about said axis and hence the housing assembly connected thereto which control resistance (1) does not exceed a predetermined value when said housing assembly is moved in either direction between said operative and folded positions and (2) exceeds said predetermined value when said housing assembly is moved into said operative position in a direction away from said folded position and away from said operative position in response to an unwanted impact blow applied to said housing assembly in a direction away from said folded position and a spring biased indexing system between said motion transmitting member and said movable tubular member constructed and arranged to (1) transmit the movement of said motion transmitting member in response to a desired rotation of said output shaft to said movable tubular member to thereby move said housing assembly between said operative and folded positions with said control system providing a control resistance to such movement which does not exceed said predetermined value in response to the desired rotation of said motor shaft and (2) allow said movable tubular member to be moved with said housing assembly from the operative position thereof relative to said motion transmitting member in response to an unwanted impact blow applied to said housing assembly (1) in a direction to move said housing assembly from said operative position toward said folded position with said indexing system providing an indexing resistance to such movement which is independent of the control resistance provided by said control system and (2) in a direction to move said housing assembly beyond the operative position thereof away from said folded position with said indexing system providing an indexing resistance which is independent of the control resistance provided by said control system.

2. A vehicle mirror assembly as defined in claim 1 wherein said spring biased pivotal control system includes spring biased control structure movably carried by one of said tubular members, said control structure being spring biased to engage another of said tubular members to provide a control resistance which (1) remains constant at said predetermined value when said housing assembly is moved in any way in either direction between said operative and folded positions, (2) exceeds said predetermined value when said housing assembly is moved in any way into said operative position in a direction away from said folded position or into said folded position in a direction away from said operative position and (3) increasingly exceeds said predetermined value to a predetermined higher value and thereafter remains constant at said predetermined higher value when said housing assembly is moved away from the operative position thereof in a direction away from said folded position in response to an impact blow imparted to said housing assembly in a direction away from said folded position.

3. A vehicle mirror assembly as defined in claim 2 wherein said control structure comprises a control ring mounted on an exterior periphery of said movable tubular member for pivotal movement therewith and axial movement with respect thereto, said control ring being spring biased by a wave spring washer surrounding the exterior periphery of said movable tubular member between said control ring and a generally radially outwardly extending surface formed in the periphery of said movable tubular member.

4. A vehicle mirror assembly as defined in claim 3 wherein said outer fixed tubular member includes a plurality of angularly spaced axial projections having arcuate extents defined by opposite inclined surfaces and downwardly facing surfaces extending between adjacent inclined surfaces of adjacent projections, said control ring including a plurality of angularly spaced recesses having arcuate extents greater than said projections defined by opposite inclined surfaces and upwardly facing surfaces extending between adjacent inclined surfaces of adjacent recesses for slidably engaging the downwardly facing surfaces of said outer fixed tubular member when said housing assembly is moved between the operative and folded positions thereof, one inclined surface of each of said projections engaging one inclined surface of each recess when said housing assembly is moved into said operative position in a direction away from said folded position, another inclined surface of each projection engaging another inclined surface of each recess when said housing assembly is moved into said folded position in a direction away from said operative position, said projections engaging the upwardly facing surfaces of said control ring when said housing assembly has moved away from the operative position thereof in a direction away from the folded position after the interengaged inclined surfaces of said ring and said projections have moved in sliding relation to one another out of engagement with one another.

5. A vehicle mirror assembly as defined in claim 4 wherein said motion transmitting member comprise a ring gear positioned concentrically with said axis and mounted for rotational movement about said axis with respect to said movable tubular member.

6. A vehicle mirror assembly as defined in claim 5, wherein said spring biased indexing system includes indexing structure movably carried by one of said movable tubular members and said ring gear, said indexing structure being spring biased to engage another one of said movable tubular member and said ring gear.

7. A vehicle mirror assembly as defined in claim 6 wherein said indexing structure comprises an indexing ring mounted on an interior periphery of said movable tubular member for pivotal movement therewith and axial movement with respect thereto, said indexing ring being spring biased by a compression coil spring surrounded by said movable tubular member between said indexing ring and a generally radially outwardly extending surface formed in the interior periphery of said movable tubular member.

8. A vehicle mirror assembly as defined in claim 7 wherein said ring gear includes teeth on the interior periphery thereof and a plurality of angularly spaced indexing projections extending upwardly therefrom, said indexing ring including a plurality of angularly spaced indexing recesses for receiving said indexing projections, said indexing recesses being interconnected with surfaces for slidably engaging said indexing projections when not received in said indexing recesses.

9. A vehicle mirror assembly as defined in claim 8 wherein said power operated pivot assembly includes an inner fixed tubular member to which said electric motor is fixedly mounted, said inner fixed tubular member being fixed to said support assembly within said movable tubular member and said electric motor being constructed and arranged to be operated by electrical power in a manner to generate flux for which said inner fixed and movable tubular members constitute a flux yoke.

10. A vehicle mirror assembly as defined in claim 9 wherein said speed reduction motion transmitting assembly includes a stub shaft mounted between said support assembly and a lower end portion of said inner fixed tubular member for rotation about an axis parallel with said upright axis and an elongated shaft mounted with respect to said support assembly for rotation about an axis disposed within a plane perpendicular to the plane passing through the parallel upright axis and axis of rotation of said stub shaft, a first spiral gear fixed to said output shaft in meshing relation with a first cooperating gear fixed to said elongated shaft, a second spiral gear fixed to said elongated shaft in meshing relation with a second cooperating gear on said stub shaft and a drive gear fixed to said stub shaft in meshing relation with said ring gear.

11. A Vehicle mirror assembly as defined in claim 1 wherein said power operated pivot assembly includes an inner fixed tubular member to which said electric motor is fixedly mounted, said inner fixed tubular member being fixed to said support assembly within said movable tubular member and said electric motor being constructed and arranged to be operated by electrical power in a manner to generate flux for which said inner fixed and movable tubular members constitute a flux yoke.

12. A vehicle mirror assembly as defined in claim 11 wherein said speed reduction motion transmitting assembly includes a stub shaft mounted between said support assembly and a lower end portion of said inner fixed tubular member for rotation about an axis parallel with said upright axis and an elongated shaft mounted with respect to said support assembly for rotation about an axis disposed within a plane perpendicular to the plane passing through the parallel axes, a first spiral gear fixed to said output shaft in meshing relation with a first cooperating gear fixed to said elongated shaft, a second spiral gear fixed to said elongated shaft in meshing relation with a second cooperating gear on said stub shaft and a drive gear fixed to said stub shaft in meshing relation with said ring gear.

13. A vehicle mirror assembly as defined in claim 1 wherein said motion transmitting member comprises a ring gear positioned concentrically with said axis and mounted for rotational movement about said axis with respect to said movable tubular member.

14. A vehicle mirror assembly as defined in claim 13 wherein said spring biased indexing system includes indexing structure movably carried by one of said movable tubular members and said ring gear, said indexing structure being spring biased to engage another one of said movable tubular member and said ring gear.

15. A vehicle mirror assembly as defined in claim 14 wherein said indexing structure comprises an indexing ring mounted on an interior periphery of said movable tubular member for pivotal movement therewith and axial movement with respect thereto, said indexing ring being spring biased by a compression coil spring surrounded by said movable tubular member between said indexing ring and a generally radially outwardly extending surface formed in the interior periphery of said movable tubular member.

16. A vehicle mirror assembly as defined in claim 15 wherein said ring gear includes teeth on the interior periphery thereof and a plurality of angularly spaced indexing projections extending upwardly therefrom, said indexing ring including a plurality of angularly spaced indexing recesses for receiving said indexing projections, said indexing recesses being interconnected with surfaces for slidably engaging said indexing projections when not received in said indexing recesses.

* * * * *